United States Patent [19]

Horton

[11] Patent Number: 4,505,826

[45] Date of Patent: Mar. 19, 1985

[54] PREPACKAGED CROSSLINKED POLYMER

[75] Inventor: Roger L. Horton, Littleton, Colo.

[73] Assignee: Smith International Inc., Newport Beach, Calif.

[21] Appl. No.: 436,641

[22] Filed: Oct. 25, 1982

[51] Int. Cl.$^3$ .............................................. E21B 43/26
[52] U.S. Cl. .............................. 252/8.55 R; 252/315.3
[58] Field of Search ............... 252/8.55 R, 8.55 C, 252/315.3

[56] References Cited

U.S. PATENT DOCUMENTS

| | | | |
|---|---|---|---|
| 3,301,723 | 1/1967 | Chrisp | 252/315.3 X |
| 3,383,307 | 5/1968 | Goetz | 252/315.3 |
| 3,655,579 | 4/1972 | Crotty et al. | 252/315.3 |
| 3,888,312 | 6/1975 | Tiner et al. | 166/308 |
| 4,021,355 | 5/1977 | Holtmyer et al. | 252/8.55 R |
| 4,033,415 | 7/1977 | Holtmyer et al. | 166/308 |
| 4,313,834 | 2/1982 | Harris | 252/8.55 C |
| 4,369,124 | 1/1983 | Elphingstone et al. | 252/8.55 X |

*Primary Examiner*—Herbert B. Guynn
*Attorney, Agent, or Firm*—Sheridan, Ross & McIntosh

[57] ABSTRACT

A mixture of dry ingredients capable of forming a crosslinked polymer upon hydration for use as a fracturing fluid in processes for recovering minerals from subterranean formations. The dry mix comprises a polysaccharide, a crosslinking agent selected to become active after the polysaccharide has been substantially hydrated, and a pH-adjusting agent to facilitate the crosslinking reaction. The mix is hydrated while being pumped and reaches maximum viscosity in the subterranean formation.

13 Claims, No Drawings

PREPACKAGED CROSSLINKED POLYMER

FIELD OF THE INVENTION

This invention relates to methods and compositions for fracturing subterranean formations. In particular, it relates to a dry mix formulation forming a crosslinking polymer which may be prepared in one step by adding water.

BACKGROUND ART

Fracturing fluids comprising gels and crosslinked gels are widely used to fracture subterranean formations so as to allow the flow of fluids such as oil and gas therethrough, and make these hydrocarbon materials accessible to pumping. Gels, which can carry particulate propping agents to keep the fracture open, are preferred fracturing fluids. Crosslinked gels are preferred as having better pumping characteristics. In general such crosslinked polymers comprise an aqueous liquid, a gelling agent and a crosslinking compound. The gelling agents in general are hydratable polysaccharides having molecular weights greater than about 100,000. These include galactomannan gums, glucomannan gums, and cellulose derivatives. Among the most widely used gelling agents in the industry at the present are hydroxypropylguar gums (HPG), hydroxyethycellulose (HEC), and the carboxymethyl-substituted derivatives of each, carboxymethylhydroxypropylguar (CMHPG) and carboxymethylhydroxyethylcellulose (CMHEC). Crosslinking agents include compositions, preferably organic compositions, containing polyvalent metal ions, especially metal ions capable of +3 and +4 valent states, such as $Al^{+3}$, $Ti^{+4}$ and $Zr^{+4}$. The pH affects the speed of hydration of the gelling agent as well as the speed of crosslinking, and pH-adjusting agents are often included in the fracturing fluid mix. Commonly used pH-adjusting agents are hydrochloric acid, fumaric acid, and phthalic acid, as well as potassium biphthalate, sodium hydrogen furmarate and sodium dihydrogen citrate, to name only a few.

It is desirable in using crosslinked gels for fracturing subterranean formations that the crosslinking reaction proceed while the gel is traversing the tubular goods toward the formation. If crosslinking occurs either in or prior to entering the pumps, pumping difficulties may be encountered. If crosslinking does not occur before the gel reaches the formation, the gel will not have the viscosity required to place large quantities of proppant in the formation. Typically, gelling compositions hydrate rapidly. Because it is desirable for the gelling composition to be as completely hydrated a possible prior to addition of the crosslinking agent, prior art processes have relied on prehydration of the gelling composition in storage tanks prior to the addition of the crosslinking agent. Quality control of the final mix is sometimes difficult, and it often happens that injection pumps will be slightly out of adjustment for purposes of providing the proper flow rate for the amount of crosslinking agent being added to the gel as it is being pumped into the formation. With too much crosslinking agent, the composition gels too much or too fast for optimum flow into the formation, and with too little crosslinking agent, the composition will be too thin to advantageously effect fracturing. Adding the crosslinking agent to the gelling composition in the storage tanks would only exacerbate pumping and removal problems due to tremendous viscosity increases. Further, if the crosslinking agent becomes active before the gelling composition is completely hydrated, further hydration is essentially halted and peak viscosity will never be reached, resulting in an inferior fluid.

It is desirable that both hydration of the gelling composition and crosslinking be accomplished during the period the fracturing fluid is traveling down the well bore, so as to allow the fluid to be easily pumped, yet be viscous enough in the formation to accomplish the desired fracturing and proppant transport. It would be highly advantageous to provide prepackaged mixtures of all the dry ingredients required for the crosslinked polymer, including the crosslinking agent, in the appropriate proportions, so that it is necessary only to add these dry ingredients to the water or aqueous liquid being pumped down the well into the formation to enable mixing and pumping on a continuous basis without the need for pregelling tanks.

PRIOR ART STATEMENT

U.S. Pat. No. 3,888,312 to Tiner, et al., describes the use of organotitanates having titanium in the +4 oxidation state as crosslinking agents for a number of gelling compositions, including the gelling compositions of this invention. However, this process requires pre-mixing of the gelling agent with an aqueous solution to form a base gel. The crosslinking agent is then added to the base gel as it is being pumped into the well bore, to allow the cross-linking reaction to take place while the gel is moving into the formation. This patent does not disclose a method for pre-mixing the dry ingredients in appropriate proportions so as to eliminate the need for operator discretion and overcome the effects of faulty pumping equipment which causes the crosslinking agent to be added at too great or too small a rate to provide for the correct viscosity at the correct time.

U.S. Pat. Nos. 4,021,355 and 4,033,415 to Holtmyer, et al., describe the use of a number of gelling compositions, and a number of crosslinking agents including $lead^{+2}$, $arsenic^{+3}$, $tin^{+2}$, $antimony^{+3}$, $antimony^{+5}$, $titanium^{+4}$, $manganese^{+7}$, $chromium^{+10}$, $tantalum^{+5}$, and $niobium^{+5}$. The effect of pH on hydration of the gel and crosslinking is discussed in these patents. Critical pH ranges for operation of a number of the enumerated crosslinking agents are provided. These patents teach that raising pH will slow hydration of the gelling composition and prevent lumping thereof. These patents do not teach use of pH control to balance hydration time for the gelling agent with crosslinking time in order to provide a total dry mix crosslinked polymer as is provided by the present invention.

U.S. Pat. No. 4,313,834 to Harris describes the use of zirconium salts to crosslink pre-hydrated aqueous gels having high acidities.

Copending application Ser. No. 140,738, of Pabley, assigned in common with this application, describes the formation of acidic crosslinked polymers utilizing xanthan biopolymer, CMHEC and CMHPG as gelling compositions and hafnium, titanium, and zirconium-containing compositions as crosslinking agents to form an acidic crosslinked polymer having a pH less than 1.

U.S. patent application Ser. No. 140,737, of Pabley, assigned in common with this application, describes a process for forming an acid crosslinked polymer utilizing CMHPG and CMHEC as the gelling compositions, in combination with crosslinking agents containing titanium, zirconium, or hafnium, and hydrochloric acid from 1 to 15 weight percent in combination with hydrofluoric acid from 0.2 to 6 weight percent.

Neither of the foregoing applications provides a dry mix capable of forming a crosslinked polymer when water only is added.

BRIEF DISCLOSURE OF THE INVENTION

A method and composition for fracturing subterranean formations is provided involving a fracturing fluid comprising (a) a gelling composition which is a solvatable polysaccharide; (b) a crosslinking agent which is a compound containing a tri- or tetravalent metal; (c) a pH-adjusting agent. The relative proportions of the foregoing may be varied within limits known to the art. The specific components of the dry mix are selected so that the gelling composition is substantially completely hydrated by the time the crosslinking agent has dissolved. Thus, the polymer chains have been completely unrolled and are ready to be crosslinked by the time the polyvalent metal ion is in solution and capable of acting to crosslink the chains. If the crosslinking agent acts before the gelling agent is completely hydrated, further hydration is prevented, and peak viscosity will not be reached. Often some sacrifice of peak viscosity is necessary, but desired viscosities can still be achieved by the use of higher proportions of gelling agent to water or other aqueous hydration agent than would otherwise be required. The pH-adjusting agent is selected with respect to the specific gelling composition and the specific crosslinking agent. It is known to the art that specific combinations of gelling composition and crosslinking agent have operative and optimal pH ranges specific to these combinations. Within these limits, the rate of crosslinking tends to speed up with lower pH and slow down with higher pH. The activity of the crosslinking agent is further slowed by using a dry, powdered form thereof rather than a liquid form, and retarding the solubility thereof to the desired degree. By adjusting the pH of the system and the solubility of the crosslinking agent, so as to optimize the beginning of the crosslinking reaction and its rate with respect to the hydration rate of the gel, and the time necessary for the fracturing fluid to reach the formation, it is possible to provide a prepackaged dry mix which will provide the desired crosslinking within the desired time period with the addition of water only. The peak viscosity of the fracturing composition may be varied as desired by varying the amount of water added, the proportion of crosslinking agent to gelling composition remaining constant.

DETAILED DESCRIPTION OF THE PREFERRED EMBODIMENTS

The premix for the fracturing fluid of this invention comprises a gelling composition which is a solvatable polysaccharide having a molecular weight of at least about 100,000. This includes the galactomannan gums, glucomannan gums, and cellulose derivatives. Cellulose derivatives are rendered solvatable by reacting cellulose with hydrophyllic constituents. Guar gum, locust bean gum, karaya gum, sodium carboxymethylguar, hydroxyethylguar, sodium carboxymethlhydroxyethylguar, hydroxypropylguar, sodium carboxymethylhydroxypropylguar, sodium carboxymethylcellulose, sodium carboxymethylhydroxycellulose, and hydroxyethylcellulose are examples of useful gelling compositions. Preferred gelling compositions are hydroxypropylguar, hydroxyethylcellulose and the carboxymethyl-substituted derivatives of each, carboxymethylhydroxypropylguar (CMHPG) and carboxymethylhydroxyethylcellulose (CMHEC), with the carboxymethyl-substituted derivatives of each (CMHPG and CMHEC) being most preferred.

The crosslinking agents are compositions containing polyvalent metal ions, preferably metal ions having a valence of +3 or +4, more preferably compositions containing zirconium +4 ions, and most preferably zirconium acetal acetonate.

A pH-adjusting agent, or buffer is added to the system as necessary to adjust the pH to optimise the hydration of the gelling composition, the dissolution and activation of the crosslinking agent, and provide the necessary acidity to react with materials, such as basic clay minerals, in the formation as desired. Raising the pH of the composition has a slowing effect on the hydration of some gelling compositions. Raising the pH may also retard the activity of the crosslinking agent, but the effect of pH on both of these rates is not necessarily uniform. Since it is desirable that the gelling composition be hydrated prior to the time the crosslinking agent becomes active, it will be necessary to determine the exact pH required for the specific gelling composition and the specific crosslinking agent to be utilized, and then to select the pH-adjusting agent accordingly. Any acidic or basic material may be used to adjust pH which does not adversely react with the other materials present in the system. Examples of suitable pH adjustors are hydrochloric acid, fumaric acid, phthalic acid, potassium, biophthalate, sodium hydrogen fumarate, sodium dihydrogen citrate, adipic acid, disodium phosphate, sodium carbonate, sodium diacetate, and sulfamic acid, and more preferably furmaric acid, sodiumdiacetate, and sulfamic acid, with sodium diacetate, fumaric acid and sodium bicarbonate being most preferred.

The proportions of crosslinking agent to gelling composition are in the range of between about 1:5 and 1:10, preferably between about 1:7 and about 1:9, and most preferably about 1:8. The amount of pH-adjusting agent will depend upon the pH-adjusting agent used and the desired final pH, and will generally be at a ratio to gelling composition of between about 1:5 and about 1:20, preferably between about 1:7 and about 1:9, and more preferably about 1:8. The final pH will depend upon the combination of gelling composition and crosslinking agent chosen, as well as upon the makeup of the subterranean formation, and will generally be between about 2 and about 8.5, more preferably between about 4 and about 7.5, and most preferably between about 5 and about 6.

The physical form in which the crosslinking agent is provided in the mix is selected so as to provide a solubility rate compatible with the hydration rate of the gelling composition. Preferably all the gelling composition has been hydrated prior to dissolution of the crosslinking agent. Slowly soluble crosslinking agents such as zirconium acetyl acetonate are thus preferred. The size of the particles of the crosslinking agent may be altered to affect its solubility. The particles may also be pretreated with such compositions as wax to retard their solubility. The desired solubility rate for the crosslinking agent will be such that the crosslinking agent does not substantially act until the gelling compositions is well-hydrated. Preferably, a commercially available crosslinking agent such as powdered zirconium acetyl acetonate made by Kay Fries Company of Stoney Point, N.Y. or Harshaw Company of Los Angeles, Calif. is used for reasons of process economy.

The dry mixed ingredients are blended to disperse the crosslinking agent and pH-adjusting agent uniformly throughout the gelling composition. Propping agents (including sand, bauxite and other particulate materials known to the art) may be added to the dry ingredients.

The dry mix is added to an aqueous stream as it is pumped into the well. Rapid hydration of the gelling composition is facilitated by the turbulence of the material in the well bore. The aqueous stream may be aqueous liquid, including hard water, having a chloride concentration up to about 3,000 ppm, and preferably less than about 2,000 ppm.

The proportion of dry mixed ingredients to water will be a function of the desired peak viscosity. In general, for a desired peak viscosity of between about 800 CPS and about 2,000 CPS and about 9.6 grams of dry mix per liter of water will be utilized. The relationship between peak viscosity and ratio of gelling composition to water is well known to the art when pregelling tanks are used. However, if the gelling composition is not 100 percent hydrated when the crosslinking agent becomes active, as may occur in the practice of this invention, when the solubility of the crosslinking agent is not precisely fitted to the hydration rate of the gelling composition, the ability of the gelling composition to bind up the water will be less than the norm for the same gelling composition and the same crosslinking agent when the gelling composition is prehydrated in a gelling tank prior to the addition of the crosslinking agent. The proportion of the dry mixed ingredients to water must therefore be increased over that of prior art processes when practising the process of this invention, typically in an amount of between about 0.4 and about 0.6 weight percent, preferably between about 0.45 and about 0.55 percent, and most preferably between about 0.47 and about 0.52 percent, for any given desired viscosity. The precise increase will, of course, depend on the particular crosslinking agent and gelling composition used, and should be minimized within the limits dictated by process economies. Complete gellation of the fracturing fluid, including crosslinking thereof, will generally occur in a period of time specific for the particular gelling composition and crosslinking agent selected, dependent on the temperature of the formation, although it may be somewhat speeded or retarded within the operative pH limits for the reaction by adjusting the pH. In general, matching of the gellation time with the amount of time required for the fracturing fluid to reach the bottom of the well bore will be controlled by varying the pumping rate.

The duration necessary for completion of the crosslinking reaction will also depend upon the temperature within the well bore. In general, the crosslinking reaction goes to completion within the range of about 80° F. to about 130° F. with no problem.

The final crosslinked fracturing fluid will have a viscosity of between about 800 and about 2,500, preferably between about 1,000 and about 2,000, and most preferably between about 1,200 and about 1,600, which is comparable to prior art fracturing fluids requiring prehydration of the gelling composition in gelling tanks.

The invention is illustrated by the following examples:

EXAMPLE 1

At ambient temperature, 20 grams CMHEC was thoroughly blended using powder rollers with 2.5 grams zirconium acetyl acetonate (solubility about 1.2 minutes in water) and 2.5 grams sodium diacetate. The dry ingredients were dispersed in tap water at a concentration of 50 lbs/1,000 gal. The final pH was 5.5. Crosslinking occurred in one minute.

EXAMPLE 2

At ambient temperature, 40 grams HPG was thoroughly blended using powder rollers with 5 grams zirconium acetyl acetonate and 5 grams sodium diacetate. The dry ingredients were dispersed in tap water at a concentration of 50 lbs/1,000 gal. The final pH was 5.29. Weak crosslinking developed.

EXAMPLE 3

At ambient temperature, 40 grams CMHEC was thoroughly blended using powder rollers with 5 grams aluminum acetyl acetonate (solubility about 45 seconds) and 5 grams sodium diacetate. The dry ingredients were dispersed in tap water at a concentration of 50 lbs/1,000 gal. The final pH was 5.5. No crosslinking occurred.

EXAMPLE 4

At ambient temperature, 40 grams CMHEC was thoroughly blended using powder rollers with 5 grams potassium pyroantimonate (solubility about 30 minutes) and 5 grams sodium diacetate. The dry ingredients were dispersed in water at a concentration of 50 lbs/1000 gal. The final pH was 5.36. No crosslinking occurred.

EXAMPLE 5

At ambient temperature, 40 grams CMHEC was thoroughly blended using powder rollers with 5 grams potassium pyroantimonate and 5 grams sulfamic acid. The dry ingredients were dispersed in tap water at a concentration of 50 lbs/1,000 gal. The final pH was 4.46. No crosslinking occurred.

EXAMPLE 6

At ambient temperature, 20 grams HEC was thoroughly blended using sand rollers with 2.5 grams zirconium acetyl acetonate and 2.5 grams sodium diacetate. The dry ingredients were dispersed in tap water at a concentration of 50 lbs/1,000 gal. The final pH was 5.5. No crosslinking occurred.

EXAMPLE 7

At ambient temperature, 40 pounds CMHPG was thoroughly blended for 30 minutes using powder rollers with 5 pounds zirconium acetyl acetonate and 5 pounds sodium diacetate. The dry ingredients were dispersed in tap water at a concentration of 50 lbs/1,000 gal. and stirred with a Waring blender. The final pH was 5.73. Crosslinking occurred in 41.1 seconds.

EXAMPLE 8

At ambient temperature, 40 grams CMHPG was thoroughly blended using powder rollers with 5 grams zirconium acetyl acetonate and 5 grams powdered fumaric acid. The dry ingredients were dispersed in tap water at a concentration of 50 lbs/1,000 gal. The final pH was 4.96. Crosslinking occurred in 1 minute 4 seconds.

EXAMPLE 9

At ambient temperature, 40 grams CMHPG was thoroughly blended using powder rollers with 5 grams zirconium acetyl acetonate, 5 grams aluminum acetyl acetonate, and 5 grams sodium diacetate. The dry ingredients were dispersed in tap water at a concentration of 50 lbs/1,000 gal. The final pH was 4.78. Crosslinking occurred in 58.8 seconds.

EXAMPLE 10

At ambient temperature, 40 grams CMHPG was thoroughly blended using powder rollers with 5 grams zirconium acetyl acetonate, 13 grams aluminum acetyl acetonate, and 5 grams fumaric acid. The dry ingredients were dispursed in tap water at a concentration of 50 lbs/1,000 gal. The final pH was 4.89. Weak crosslinking occured in 2 minutes 30 seconds.

EXAMPLE 11

At ambient temperature, the formula of Example 1 was dispersed in aqueous solutions having varying pH's at a concentration of 50 lbs/1,000 gal. The pH's of the aqueous solution, pH's of the mixture after addition of the dry ingredients, hydration time and crosslink time are set forth below in tabular form:

| Beginning Aqueous pH | pH After Mixing | Hydration Time (sec.) | Crosslinking Time (sec.) |
| --- | --- | --- | --- |
| 2.99 | 4.78 | 30 | 90 |
| 3.02 | 4.96 | 60 | N.A. |
| 3.54 | 4.90 | 30 | <60 |
| 3.54 | 5.20 | 60 | 120 |
| 3.96 | 4.94 | 30 | <60 |
| 4.01 | 5.28 | >30 | 60 |
| 4.50 | 5.32 | >30 | 60 |
| 4.51 | 4.94 | 30 | 50 |
| 4.98 | 4.98 | 30 | <60 |
| 5.06 | 5.35 | >30 | 60 |
| 5.48 | 4.99 | 20 | 45 |
| 5.57 | 5.35 | >30 | 45 |
| 6.02 | 5.04 | 20 | 45 |
| 6.08 | 5.36 | >30 | 40 |
| 6.55 | 5.44 | 30 | 55 |
| 7.05 | 5.42 | <30 | 45 |
| 7.49 | 5.43 | <30 | 40 |
| 7.96 | 5.43 | >30 | >45 |
| 8.12 | 5.47 | <30 | 50 |
| 8.47 | 5.48 | <30 | 50 |
| 9.03 | 5.47 | >30 | 55 |
| 9.08 | 5.56 | <30 | 60 |
| 9.56 | 5.46 | <30 | 60 |
| 10.0 | 5.67 | <30 | >60 |
| 10.06 | 5.49 | <30 | 60 |
| 10.88 | 5.60 | <30 | 60 |
| 11.03 | 5.93 | <40 | >60 |
| 11.07 | 5.79 | <30 | 60 |
| 11.25 | 6.19 | 30 | 68 |
| 11.51 | 7.14 | 45 | N.A. |
| 11.52 | 6.83 | 45 | N.A. |
| 12.00 | 9.86 | 60 | N.A. |

EXAMPLE 12

The formula of Example 1 was hydrated with water containing 2 percent potassium chloride at various temperatures, to a concentration of 2,000 ppm, and the crosslink time measured. Results are set forth in tabular form below:

| Temp. (°F.) | Cross-link Time (sec.) |
| --- | --- |
| −2 | N.A. |
| 34 | 240 (weak) |
| 45 | 90 |
| 72 | <60 |
| 100 | <60 |
| 110 | 60 |
| 130 | 50 (weak) |
| 150 | N.A. |

EXAMPLE 13

The formula of Example 1 (formula 1) was compared with formulas containing two buffers. Each formula was hydrated with water to a concentration of 50 lbs/1,000 gal. at two different pH's. The formulas are as follows:

| | |
| --- | --- |
| Formula 1: | 40 pounds CMHEC |
| | 5 pounds zirconium acetyl acetonate |
| | 5 pounds sodiumdiacetate |
| Formula 2: | 40 pounds CMHEC |
| | 5 pounds zirconium acetyl acetonate |
| | 4 pounds sodium diacetate |
| | 1 pound sodium bicarbonate |
| Formula 3: | 40 pounds CMHEC |
| | 5 pounds zirconium acetyl acetonate |
| | 4.5 pounds sodiumdiacetate |
| | .5 pounds sodium carbonate |

The results are set forth in tabular form below:

| Formula | Beginning Aqueous pH | pH After Mixing | Hydration Time (sec.) | Cross-link Time (sec.) |
| --- | --- | --- | --- | --- |
| 1 | 6.90 | 5.55 | <30 | <45 |
| 1 | 11.01 | 6.07 | <30 | <90 |
| 2 | 7.00 | 6.05 | <30 | <90 |
| 2 | 11.04 | 6.83 | <30 | N.A. |
| 3 | 6.93 | 6.24 | <30 | N.A. |
| 3 | 11.02 | 7.35 | <30 | N.A. |

EXAMPLE 14

At ambient temperature, 45 pounds CMHEC was thoroughly blended using powder rollers with 5 pounds zirconium acetyl acetonate, 1 pound sodium bicarbonate, and 4 pounds fumaric acid having a particle size of 80 mesh (Tyler). The dry ingredients were dispersed in aqueous solutions having different pH values, at a concentration of 50 lbs/1,00 gal. Results are set forth in tabular form below:

| Beginning Aqueous pH | pH After Mixing | Hydration Time (sec.) | Cross-link Time (sec.) |
| --- | --- | --- | --- |
| 9.48 | 5.60 | <30 | 300 |
| 7.00 | 6.40 | <30 | 100 |

Although the foregoing invention has been described in some detail by the way of illustration and example for purposes of clarity of understanding, it will be obvious that certain changes and modifications may be practiced within the spirit of the invention, as limited only by the scope of the appended claims.

I claim:

1. A mixture of dry ingredients capable of forming a crosslinked polymer upon hydration comprising:
    (a) A polysaccharide having a molecular weight of at least about 100,000 selected from the group consisting of carboxymethylhydroxypropylguar, and carboxymethylhydroxyethylcellulose;

(b) A crosslinking agent selected from the group consisting of zirconium acetyl acetonate and mixtures of zirconium acetyl acetonate and aluminum acetyl acetonate at a ratio of 1:1, having a solubility rate greater than or equal to the hydration rate of the polysaccharide, in an amount sufficient to crosslink essentially all the polysaccharide chains; and (c) A pH-adjusting agent selected from the group consisting of sodium diacetate and fumaric acid and a combination of fumaric acid and sodium bicarbonate in an amount necessary to cause the mixture to attain the required pH for the crosslinking reaction upon hydration;

in which the ratio of a:b is about 4:1 to 9:1 and the ratio of b:c is about 1:1 to 2:1.

2. A process for fracturing a subterranean formation which comprises injecting an aqueous solution into said formation, while adding a mixture of dry ingredients comprising:

(a) A polysaccharide having a molecular weight of at least about 100,000 selected from the group consisting of carboxymethylhydroxypropylguar, and carboxymethylhydroxyethylcellulose;

(b) A crosslinking agent selected from the group consisting of zirconium acetyl acetonate and mixtures of zirconium acetyl acetonate and aluminum acetyl acetonate at a ratio of 1:1, having a solubility rate greater than or equal to the hydration rate of the polysaccharide, in an amount sufficient to crosslink essentially all the polysaccharide chains; and, (c) A pH-adjusting agent selected from the group consisting of sodium diacetate and fumaric acid and a combination of fumaric acid and sodium bicarbonate in an amount necessary to cause the mixture to attain the required pH for the crosslinking reaction upon hydration;

in which the ratio of a:b is about 4:1 to 9:1 and the ratio of b:c is about 1:1 to 2:1.

3. The process of claim 2 in which the pH-adjusting agent is selected to adjust the pH of the polymer upon hydration to between about 4.5 and about 6.0.

4. The process of claim 2 in which the particles of the crosslinking agent are coated with a material which retards their solubility rate.

5. The process of claim 2 in which the crosslinking reaction is carried out at a temperature of between about 80° F. and about 130° F.

6. The process of claim 2 in which the ratio of dry mixed ingredients to aqueous solution is between about 40 lbs/1,000 gal. and about 60 lbs/1,000 gal.

7. The process of claim 2 in which the crosslinked polymer has a final viscosity of between about 800 CPS and about 2,500 CPS.

8. The process of claim 2 in which the crosslinking reaction is completed in the period of time required for the mixture to travel the length of the well bore into the fracture created in the formation.

9. The process of claim 2 in which component (a) is carboxymethylhydroxyethylcellulose, component (b) is zirconium acetyl acetonate, and component (c) is sodium diacetate, and the ratio of a:b:c is about 8:1:1.

10. The process of claim 2 in which component (a) is carboxymethylhydroxypropylguar, component (b) is zirconium acetyl acetonate, and component (c) is sodium diacetate, and the ratio of a:b:c is about 8:1:1.

11. The process of claim 2 in which component (a) is carboxymethylhydroxypropylguar, component (b) is zirconium acetyl acetonate, and component (c) is fumaric acid, and the ratio of a:b:c is about 8:1:1.

12. The process of claim 2 in which component (a) is carboxymethylhydroxypropylguar, component (b) is an equal mixture of zirconium acetyl acetonate and aluminum acetyl acetonate, and component (c) is sodium diacetate, and the ratio of a:b:c is about 8:2:1.

13. The process of claim 2 in which component (a) is carboxymethylhydroxyethylcellulose, component (b) is zirconium acetyl acetonate, and component (c) is fumaric acid and sodium-bicarbonate at a ratio of 4:1, and the ratio of a:b:c is about 9:1:1.

* * * * *